(12) United States Patent
Wilkens et al.

(10) Patent No.: US 8,555,030 B2
(45) Date of Patent: Oct. 8, 2013

(54) CREATING MULTIPLE VERSIONS FOR INTERIOR POINTERS AND ALIGNMENT OF AN ARRAY

(75) Inventors: Tim J. Wilkens, Modesto, CA (US); Michael C. Berg, Vancouver, WA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 188 days.

(21) Appl. No.: 13/182,608

(22) Filed: Jul. 14, 2011

(65) Prior Publication Data

US 2013/0019060 A1    Jan. 17, 2013

(51) Int. Cl.
*G06F 9/312* (2006.01)
*G06F 12/04* (2006.01)

(52) U.S. Cl.
USPC ............ 711/217; 717/152; 717/154; 717/160

(58) Field of Classification Search
USPC ................. 711/213, 214, 217; 717/152, 154, 717/160
See application file for complete search history.

(56) References Cited

U.S. PATENT DOCUMENTS

| | | | |
|---|---|---|---|
| 8,056,069 B2 * | 11/2011 | Eichenberger et al. | 717/160 |
| 8,087,012 B2 * | 12/2011 | Chan | 717/160 |
| 2001/0044930 A1 * | 11/2001 | Miyata et al. | 717/9 |
| 2005/0246700 A1 * | 11/2005 | Archambault et al. | 717/156 |
| 2005/0283773 A1 * | 12/2005 | Eichenberger et al. | 717/151 |
| 2007/0169058 A1 * | 7/2007 | Eichenberger et al. | 717/160 |
| 2008/0052693 A1 * | 2/2008 | Archambault et al. | 717/151 |
| 2008/0222623 A1 | 9/2008 | Eichenberger et al. | |
| 2009/0064120 A1 * | 3/2009 | Liu et al. | 717/160 |

* cited by examiner

*Primary Examiner* — Hal Schnee
(74) *Attorney, Agent, or Firm* — Harrity & Harrity, LLP

(57) ABSTRACT

A device identifies array accesses of variables in a program code that includes multiple arrays, and identifies array access patterns for one of the array accesses. The device also determines an order of the array access patterns identified for the array accesses, and calculates, based on the order, distances between the array access patterns. The device further shares address calculations amongst the array accesses associated with array access patterns with one or more of the distances that are equivalent.

20 Claims, 11 Drawing Sheets

FIG. 4

```
DO I = I1, I2  ← LOOP (410)
  DO J = J1, J2  ← LOOP (420)
ARRAY (430) → DUDZ(I) = DZI*R12I*(U(I,J,K) - U(I,J+1,K) + 8.0D0*(U(I,J+2,K) - U(I,J+1,K)))
ARRAY (440) → DVDZ(I) = DZI*R12I*(V(I,J,K) - V(I,J+1,K) + 8.0D0*(V(I,J+2,K) - V(I,J+1,K)))
ARRAY (450) → DWDZ(I) = DZI*R12I*(W(I,J,K) - W(I,J+1,K) + 8.0D0*(W(I,J+2,K) - W(I,J+1,K)))
  END DO
END DO
```

VARIABLE (460), VARIABLE (470), VARIABLE (480)

400

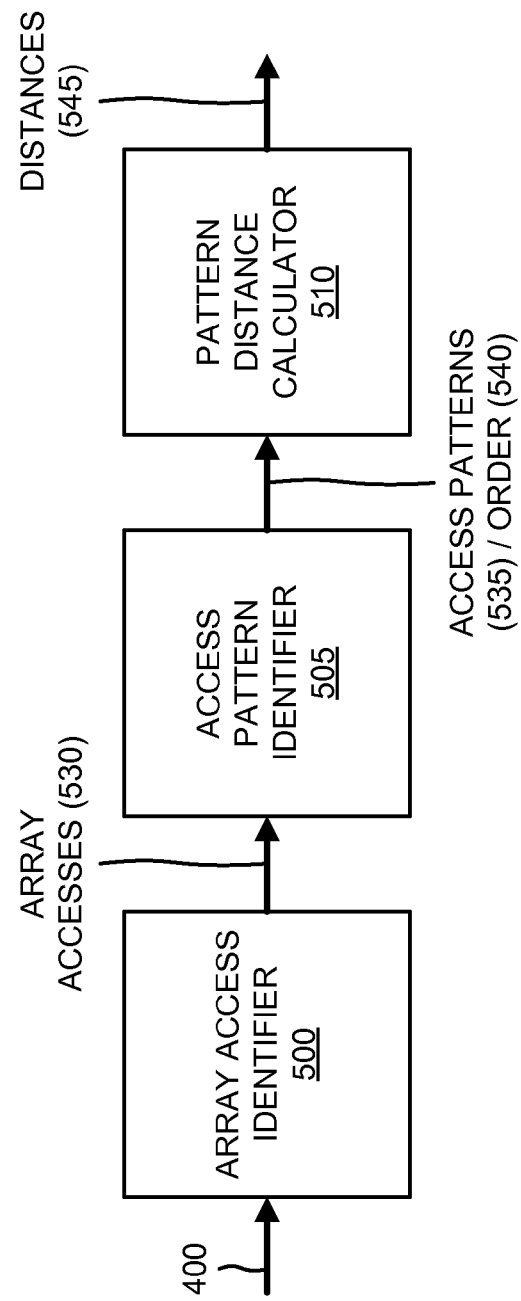

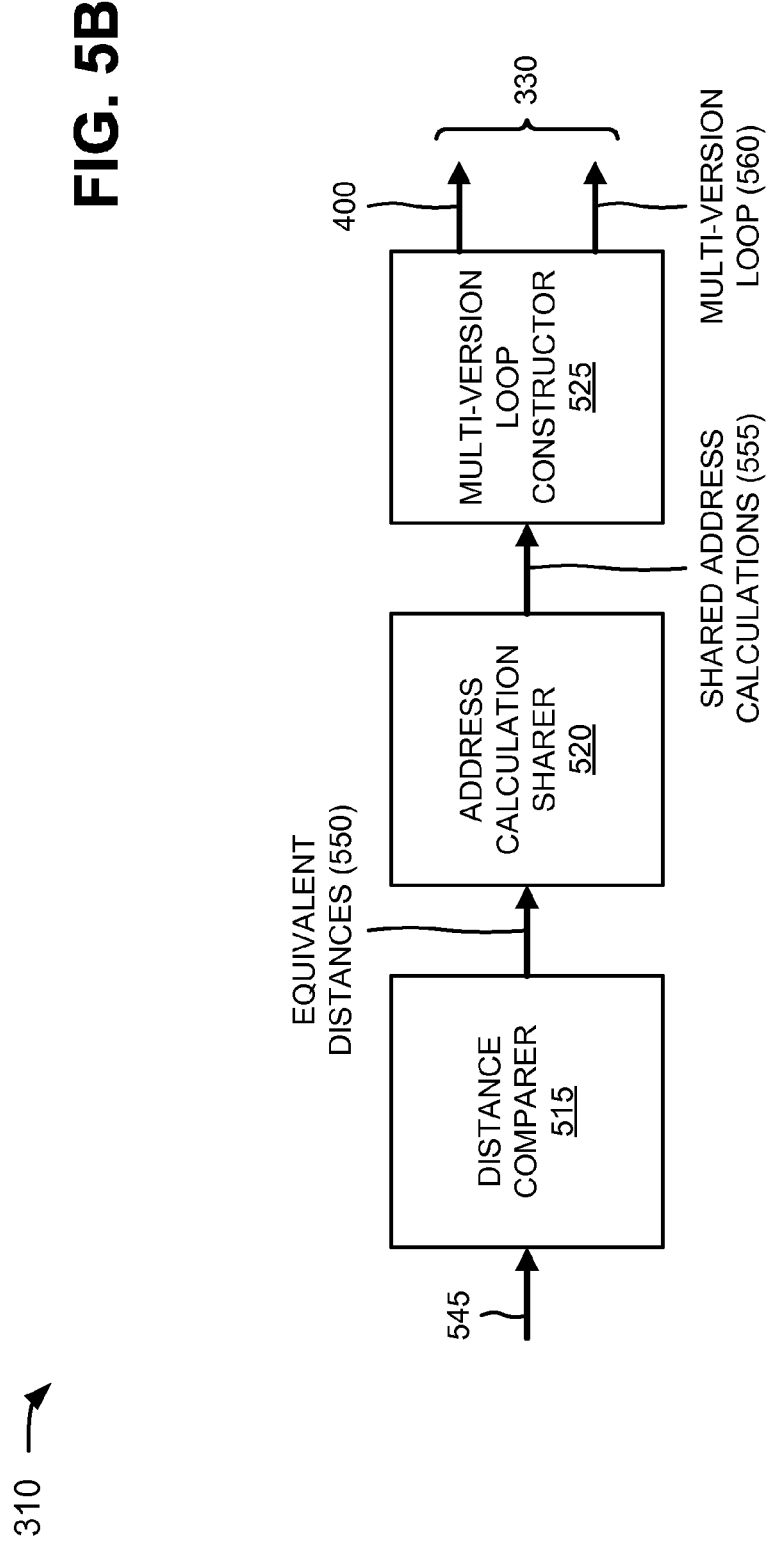

FIG. 7

```
          ┌── LOOP (710)
DO I = I1, I2
                                                                            VARIABLE (760)
                                                                                   ↓
ARRAY (720) → DUDZ(I) = DZI*R12I*(UAV(I,J,K-2) - UAV(I,J,K+2) + 8.0D0*(UAV(I,J,K+1) - UAV(I,J,K-1)))
ARRAY (730) → DVDZ(I) = DZI*R12I*(VAV(I,J,K-2) - VAV(I,J,K+2) + 8.0D0*(VAV(I,J,K+1) - VAV(I,J,K-1)))
ARRAY (740) → DWDZ(I) = DZI*R12I*(WAV(I,J,K-2) - WAV(I,J,K+2) + 8.0D0*(WAV(I,J,K+1) - WAV(I,J,K-1)))
                                          ↑
                                     VARIABLE (750)                    VARIABLE (770)
END DO
```

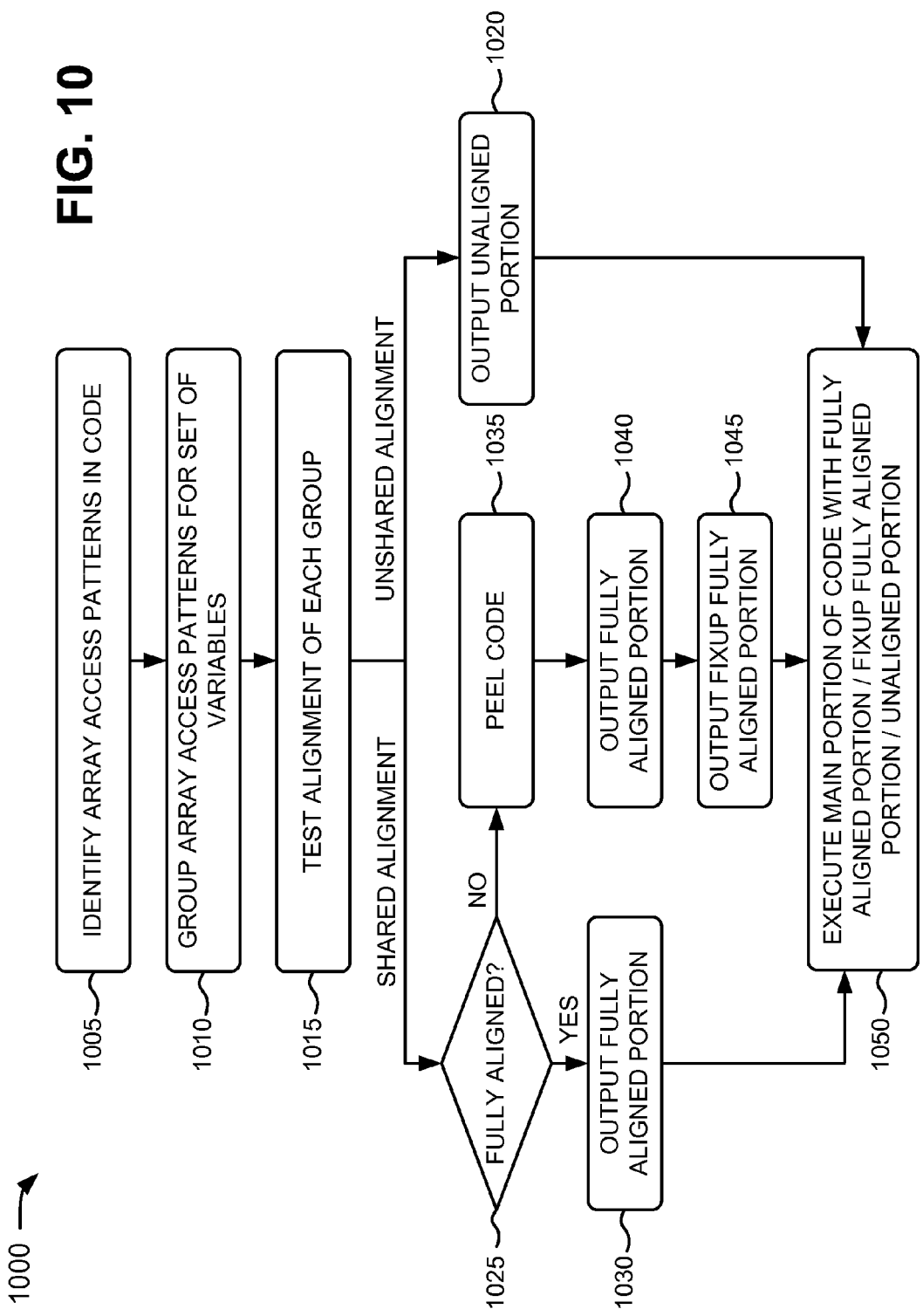

CREATING MULTIPLE VERSIONS FOR INTERIOR POINTERS AND ALIGNMENT OF AN ARRAY

BACKGROUND

Multimedia extensions (MMEs) have become one of the most popular additions to general-purpose processors. Existing multimedia extensions can be characterized as Single Instruction Multiple Datapath (SIMD) units that support packed fixed-length vectors. The traditional programming model for multimedia extensions has been explicit vector or array programming using either (in-line) assembly or intrinsic functions embedded in a high-level programming language. However, such array-based programs create runtime penalties for a processor due to unaligned loads from memory in SIMD operations. The array-based programs may include aligned code and unaligned code. Aligned code means that desired data resides at an address that is a multiple of a vector register size. Memory penalties due to crossing multiple memory blocks may be prevented when code is aligned.

Furthermore, processors have a number of registers (e.g., 32-bit registers) that perform certain functions. For example, some registers may address memory locations that are offset by a multiple of common offsets. However, the array-based programs cause stack spills and refills of such registers, which inflicts penalties on a processor.

SUMMARY OF EMBODIMENTS OF THE INVENTION

According to one embodiment, a method may include: identifying, by a device, array accesses of variables in a program code that includes multiple arrays; identifying, by the device, array access patterns for one of the array accesses; determining, by the device, an order of the array access patterns identified for the array accesses; calculating, by the device and based on the order, distances between the array access patterns; and sharing, by the device, address calculations amongst the array accesses associated with array access patterns with one or more of the distances that are equivalent.

According to another embodiment, a compiler of a device may include processing logic to: identify array accesses of variables in a program code that includes multiple arrays, identify array access patterns for one of the array accesses, determine an order of the array access patterns identified for the array accesses, calculate, based on the order, distances between the array access patterns, share address calculations amongst the array accesses associated with array access patterns with one or more of the distances that are equivalent, and create a compiled version of the program code that includes the shared address calculations.

According to still another embodiment, a method may include: identifying, by a device, array access patterns in a program code that includes multiple arrays; grouping, by the device, the array access patterns for a set of variables of the multiple arrays; testing, by the device, an alignment for each group of the array access patterns; determining, by the device and based on the testing, that at least one group of the array access patterns includes a shared alignment; determining, by the device, whether the at least one group of the array access patterns includes a fully aligned portion of the program code; and executing, by the device, the program code with the fully aligned portion of the program code when the at least one group of the array access patterns includes the fully aligned portion of the program code.

According to a further embodiment, A compiler of a device may include processing logic to: identify array access patterns in a program code that includes multiple arrays, group the array access patterns for a set of variables of the multiple arrays, test an alignment for each group of the array access patterns, determine, based on the test, that at least one group of the array access patterns includes a shared alignment, determine whether the at least one group of the array access patterns includes a fully aligned portion of the program code, and execute the program code, with the fully aligned portion of the program code, to create a compiled version of the program code, when the at least one group of the array access patterns includes the fully aligned portion of the program code.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 4 is a diagram of an example portion of interior pointer source program code that may be generated by a code generator and compiled by a compiler depicted in FIG. 3;

FIGS. 5A and 5B are diagrams of example functional components of the compiler illustrated in FIG. 3;

FIG. 7 is a diagram of an example portion of alignment source program code that may be generated by the code generator and compiled by the compiler illustrated in FIG. 3;

FIG. 10 is a flow chart of an example process for creating multiple versions for alignment of an array according to an embodiment described herein.

DETAILED DESCRIPTION

The following detailed description refers to the accompanying drawings. The same reference numbers in different drawings may identify the same or similar elements.

Overview

In one embodiment, systems and/or methods described herein may provide a unification test that determines, without complete information about an array shape, whether array accesses to multiple array variables have similar access patterns. The systems and/or methods may address many more situations than current compilers since complete information about array shape in the compiler is not always available. The systems and/or methods may reduce register pressure for shared address calculations when spill/refill code is present. The reduced register pressure may dramatically enhance performance of code since instructions with high latency may be removed and memory pressure on the processor can be reduced.

In another embodiment, systems and/or methods described herein may provide a unification test technique that efficiently identifies alignment groupings for multidimensional array variables that have similar access patterns. The unification test technique may not be limited to array variables with similar access patterns, but may also be applied generally to several multi-versioned loops. The systems and/or methods may also provide a peeling technique that facilitates arbitrary granular alignment. The peeling technique may address specialized cases that are determined in the unification test technique and for which data path alignment groups can be derived at runtime via the test technique. The peeling technique may mitigate unaligned access penalties on SIMD architectures. The unification test technique may test for arbitrary memory alignment and may perform an arbitrary number of prologue peelings in order to enable memory aligned array accesses in an array loop body. The unification test technique may generate epilog fixup code (as needed) to facilitate correctness for iteration space that is unencumbered or significantly less encumbered by unaligned access penalties.

The terms "component" and "device," as used herein, are intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Example Environment and Device

Figure 1:
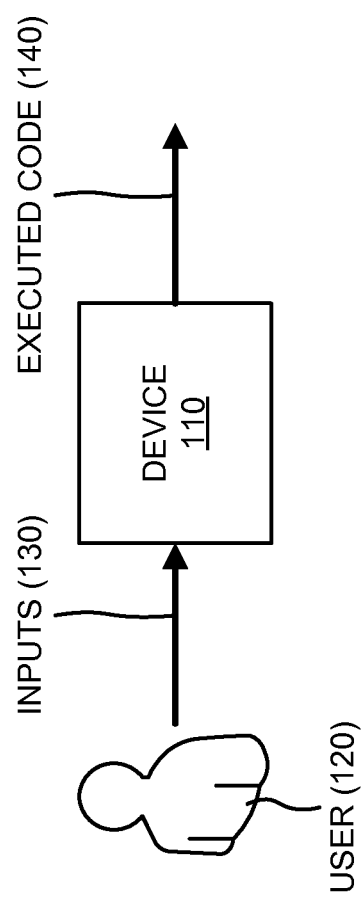
FIG. 1 is a diagram of an example environment according to an embodiment described herein.

FIG. 1 is a diagram of an example environment 100 according to an embodiment described herein. As shown, environment 100 may include a device 110 and user 120 that may interact with device 110. A single device 110 and user 120 have been illustrated in FIG. 1 for simplicity. In practice, there may be more devices 110 and/or users 120.

Device 110 may include one or more server devices, or other types of computation or communication devices, that gather, process, and/or provide information in a manner described herein. For example, device 110 may include a personal computer, a desktop computer, a laptop computer, a tablet computer, a server device, a radiotelephone, a personal communications system (PCS) terminal, a personal digital assistant (PDA), a cellular telephone, a smart phone, and/or one or more other types of computation or communication devices.

Device 110 may receive inputs 130 from user 120 via an input component (e.g., a keyboard, a mouse, a touch screen, etc.) of device 110. Inputs 130 may include program code written by user 120, such as, for example, an array-based program code written by user 120; inputs to the array-based program code; etc. Device 110 may receive inputs 130 from user 120, and may compile the program associated with inputs 130. Device 110 may execute the compiled program, and may output the executed code, as indicated by reference number 140.

In one example embodiment, device 110 may identify array accesses of variables in the program code, and may identify array access patterns for each array access. Device 110 may determine an order of the array access patterns, and may calculate, based on the order, distances between the array access patterns. Device 110 may share address calculations amongst the array accesses when the calculated distances between the array access patterns are equivalent, and may construct a multi-version loop with the distance calculations applied and/or another multi-version loop without the distance calculations applied.

In another example embodiment, device 110 may identify array access patterns in the program code, may group the array access patterns for a set of variables, and may test an alignment of each group of array access patterns. If the alignment of a particular group is unshared, device 110 may output an unaligned portion for the particular group. If the alignment of the particular group is shared, device 110 may determine whether a portion of the particular group is fully aligned. If the portion of the particular group is fully aligned, device 110 may output the fully aligned portion. If the portion of the particular group is not fully aligned, device 110 may peel code from the portion, may output the fully aligned portion after the peeling of the code, and may fix the fully aligned portion (if necessary). Device 110 may execute a main portion of the program code with the fully aligned portion, the fixed fully aligned portion, and/or the unaligned portion.

Although FIG. 1 shows example components of environment 100, in other embodiments, environment 100 may include fewer components, different components, differently arranged components, or additional components than depicted in FIG. 1. Alternatively, or additionally, one or more components of environment 100 may perform one or more other tasks described as being performed by one or more other components of environment 100.

Figure 2:
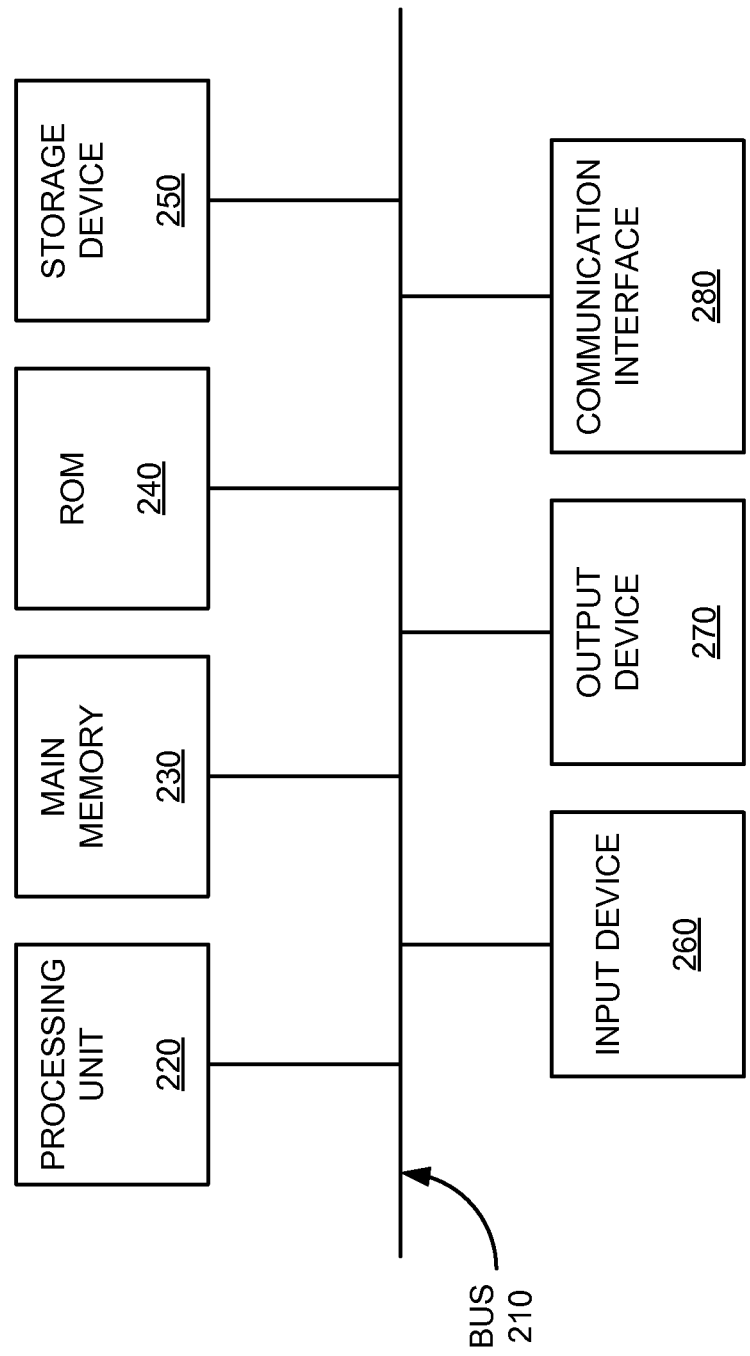
FIG. 2 is a diagram of example components of a device depicted in FIG. 1.

FIG. 2 is a diagram of example components of device 110. As illustrated, device 110 may include a bus 210, a processing unit 220, a main memory 230, a ROM 240, a storage device 250, an input device 260, an output device 270, and/or a communication interface 280. Bus 210 may include a path that permits communication among the components of device 110.

Processing unit 220 may include one or more processors (e.g., multi-core processors), microprocessors, ASICS, FPGAs, a central processing unit (CPU), a graphical processing unit (GPU), or other types of processing units that may interpret and execute instructions. In one embodiment, processing unit 220 may include a single processor that includes multiple cores. Main memory 230 may include a RAM, a dynamic RAM (DRAM), and/or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator (e.g., user 120) to input information to device 110, such as a keyboard, a mouse, a pen, a microphone, voice recognition and/or biometric mechanisms, a touch screen, etc. Output device 270 may include a mechanism that outputs information to the operator, including a display, a printer, a speaker, etc. Communication interface 280 may include any transceiver-like mechanism that enables device 110 to communicate with other devices and/or systems. For example, communication interface 280 may include mechanisms for communicating with another device or system via a network.

As described herein, device 110 may perform certain operations in response to processing unit 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, embodiments described herein are not limited to any specific combination of hardware circuitry and software.

Although FIG. 2 shows example components of device 110, in other embodiments, device 110 may include fewer components, different components, differently arranged components, or additional components than depicted in FIG. 2. Alternatively, or additionally, one or more components of device 110 may perform one or more other tasks described as being performed by one or more other components of device 110.

Figure 3:
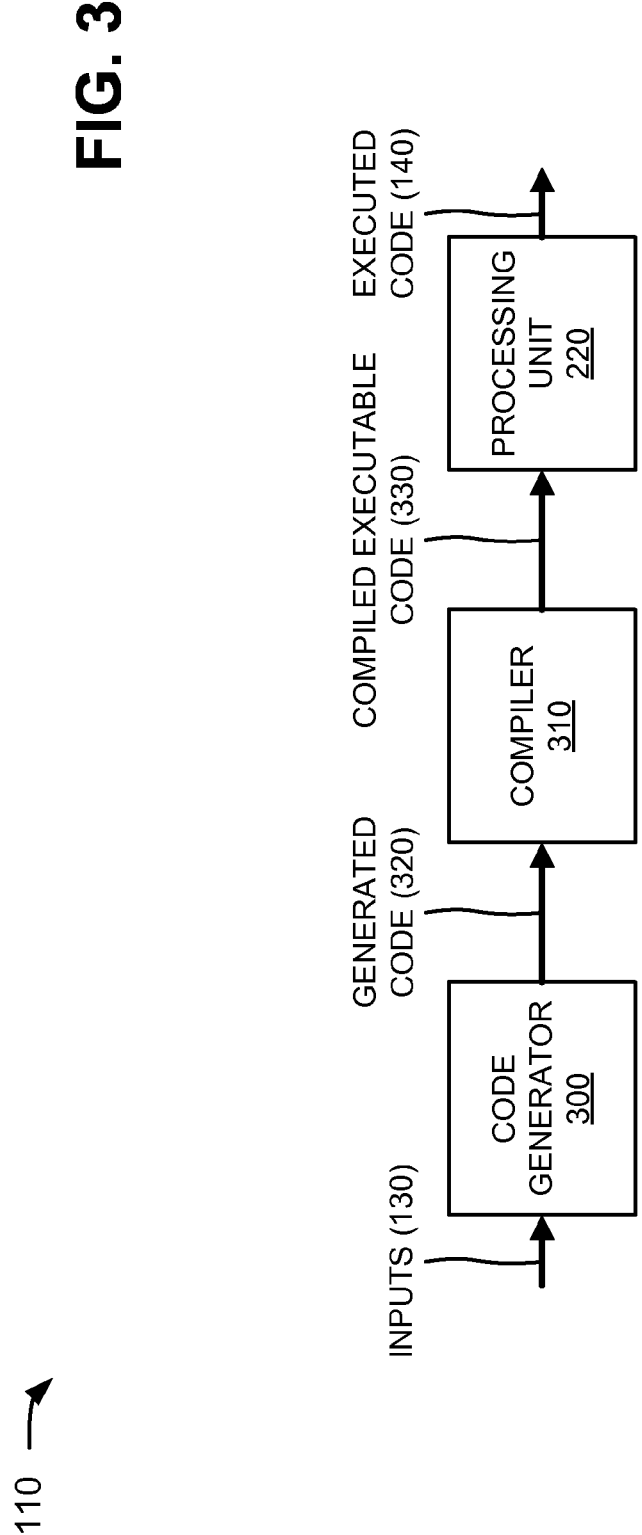
FIG. 3 is a diagram of further example components of the device illustrated in FIG. 1.

FIG. 3 is a diagram of further example components of device 110. As illustrated, device 110 may include processing unit 220, a code generator 300, and a compiler 310. Processing unit 220 may include the features described above in connection with FIG. 2.

Code generator 300 may include hardware or a combination of hardware and software that receives inputs 130 from user 120, and generates code based on inputs 130, as indicated by reference number 320. In one example, code generator 300 may receive inputs 130, such as, for example, array identifiers, array input variables, array output variables, etc., may create generated code 320 based on inputs 130, and may output generated code 320 to compiler 310. Generated code 320 may include an array-based program that includes multiple loops, arrays, input variables, output variables, etc. In one example, generated code 320 may include program code generated in a variety of programming languages, such as C++, C, Fortran, Pascal, etc.

Compiler 310 may include hardware or a combination of hardware and software that may receive generated code 320 from code generator 300, and may compile generated code 320 to produce compiled executable code 330. Compiled executable code 330 may include assembly code that may be understood by processing unit 220. As shown in FIG. 3, compiler 310 may provide compiled executable code 330 to processing unit 220 (e.g., for execution). In one example embodiment, compiler 310 may correspond to an Open64 compiler (e.g., an open source, optimizing compiler for ITANIUM and x86-64 microprocessor architectures). In other embodiments, compiler 310 may correspond to a compiler for other types of microprocessor architectures. Further details of compiler 310 are provided below in connection with, for example, FIGS. 5A-6 and 8.

Processing unit 220 may receive compiled executable code 330 from compiler 310, and may execute compiled executable code 330 to produce executed code 140. Processing unit 220 may output executed code 140 to, for example, user 120.

Although FIG. 3 shows further example components of device 110, in other embodiments, device 110 may include fewer components, different components, differently arranged components, or additional components than depicted in FIG. 3. Alternatively, or additionally, one or more components of device 110 may perform one or more other tasks described as being performed by one or more other components of device 110.

Example Interior Pointer Source Code

FIG. 4 is a diagram of an example portion 400 of interior pointer source program code that may be generated by code generator 300 and compiled by compiler 310. In one example embodiment, code portion 400 may include Fortran code. In other embodiments, code portion 400 may include code in other programming languages, such as Pascal, C, C++, etc.

As further shown in FIG. 4, code portion 400 may include a first loop 410 associated with parameters I, I1, and I2, and a second loop 420 associated with parameters J, J1, and J2. A plurality of arrays may be calculated within loops 410 and 420 of code portion 400. For example, a first array 430, DUDZ(I), may be accessed via second loop 420; a second array 440, DVDZ(I), may be accessed via second loop 420; and a third array 450, DWDZ(I), may be accessed via second loop 420. First array 430 may include an array variable 460 (U), second array 440 may include an array variable 470 (V), and third array 450 may include an array variable 480 (W).

In one example embodiment, code portion 400 may correspond to generated code 320 received by compiler 310 (FIG. 3). Compiler 310 may receive code portion 400, and may identify accesses of arrays 430-450 based on array variables 460-480 (e.g., based on U, V, and W). Once compiler 310 identifies all array accesses of array variable 460 (U), compiler 310 may identify internal access patterns, such as J, J+1, and J+2. Compiler 310 may perform the same operations for array variable 470 (V) and array variable 480 (W), and may mark each array access pattern so that a distance calculation may be constructed between ordered array access patterns. Compiler 310 may use a shape analysis to detect the ordering of access patterns, J, J+1, and J+2, for the analyzed arrays 430-450. Further details of how compiler 310 may analyze code portion 400 are provided below in connection with, for example, FIGS. 5A-6.

Although FIG. 4 shows example elements of code portion 400, in other embodiments, code portion 400 may include fewer elements, different elements, differently arranged elements, or additional elements than depicted in FIG. 4.

Example Operation of Compiler

FIGS. 5A and 5B are diagrams of example functional components of compiler 310. As shown, compiler 310 may include an array access identifier 500, an access pattern identifier 505, a pattern distance calculator 510, a distance comparer 515, an address calculation sharer 520, and a multi-version loop constructor 525.

Array access identifier 500 may receive code portion 400 from code generator 300, and may identify array accesses 530 of variables in code portion 400. For example, with reference to FIG. 4, array access identifier 500 may identify accesses of arrays 430-450 based on array variables 460-480 (e.g., based on U, V, and W). Array access identifier 500 may provide array accesses 530 to access pattern identifier 505.

Access pattern identifier 505 may receive array accesses 530 from array access identifier 500, and may identify array access patterns 535 for each array access 530. For example, with reference to FIG. 4, access pattern identifier 505 may identify internal access patterns, such as J, J+1, and J+2, for array variable 460 (U), and may identify internal access patterns for array variable 470 (V) and array variable 480 (W). Access pattern identifier 505 may determine (e.g., using a shape analysis) an order 540 for array access patterns 535. For example, with reference to FIG. 4, access pattern identifier 505 may use a shape analysis to detect the ordering of access patterns, J, J+1, and J+2, for the analyzed arrays 430-450. Access pattern identifier 505 may provide array access patterns 535 and/or order 540 to pattern distance calculator 510.

Pattern distance calculator 510 may receive array access patterns 535 and/or order 540 from access pattern identifier 505, and may calculate, based on order 540, distances 545 between array access patterns 535. For example, with reference to FIG. 4, pattern distance calculator 510 may calculate a distance between access patterns J and J+1 and a distance between access patterns J+1 and J+2 for array variables 460-480 (e.g., U, V, and W).

Figure 6:
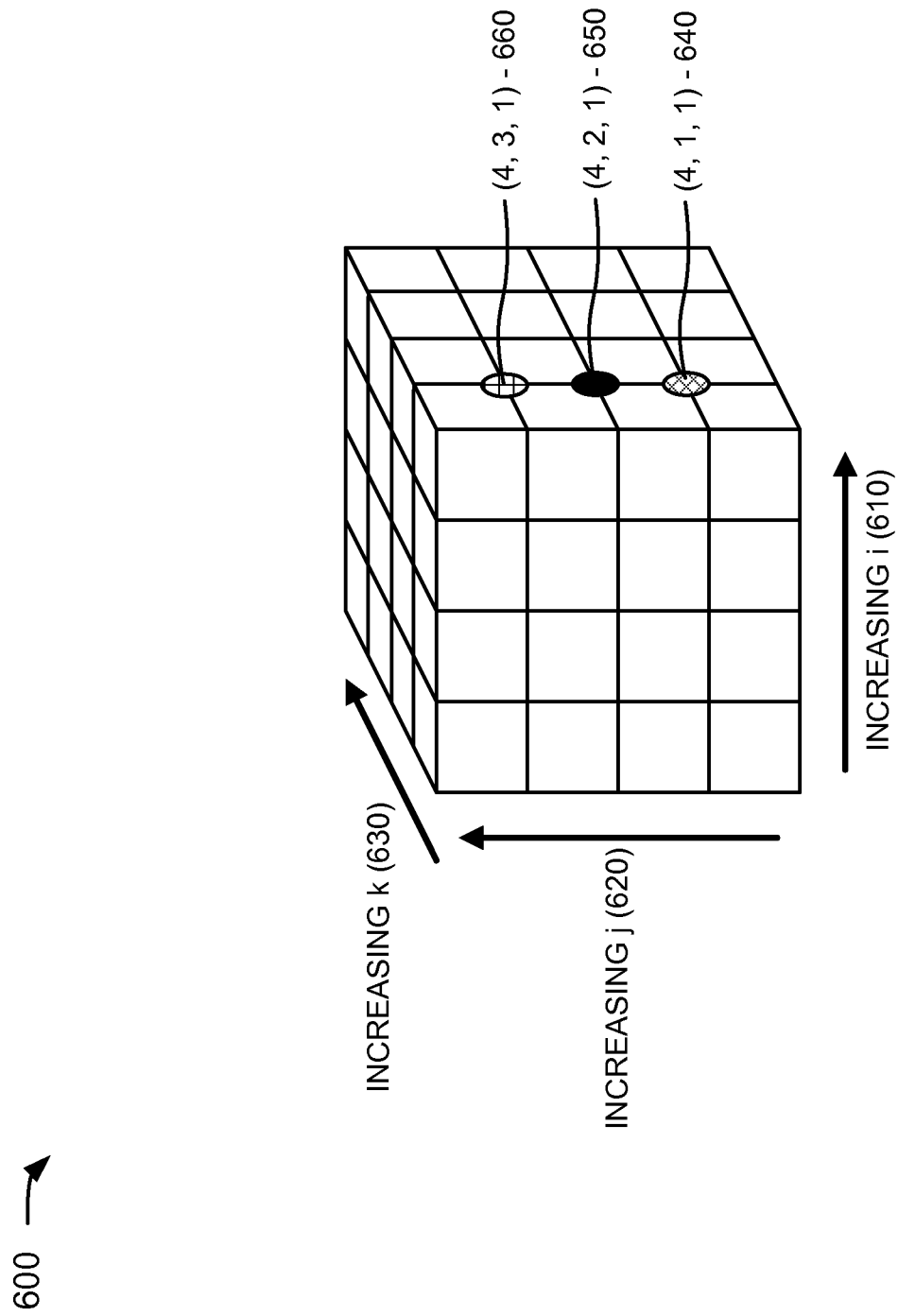
FIG. 6 is a diagram of an example array capable of being utilized by a pattern distance calculator depicted in FIG. 5A.

FIG. 6 is a diagram of an example array 600 capable of being utilized by pattern distance calculator 510 to calculate distances between array access patterns. As shown, example array 600 may be a 4×4×4 array with an i axis increasing in a direction of arrow 610, a j axis increasing in a direction of arrow 620, and a k axis increasing in a direction of arrow 630. It may be assumed that a first point 640, at V(4, 1, 1), corresponds to a first array access pattern, that a second point 650, at V(4, 2, 1), corresponds to a second array access pattern, and that a third point 660, at V(4, 3, 1), corresponds to a third array access pattern. Pattern distance calculator 510 may calculate a distance between first point 640 and second point 650 and between second point 650 and third point 660. If an element size is assumed to be eight (8) bytes, pattern distance calculator 510 may determine that first point 640 is a full unit (or 32 bytes) away (e.g., in the j direction) from second point 650. Pattern distance calculator 510 may determine that second point 650 is a full unit (or 32 bytes) away (e.g., in the j direction) from third point 660. Thus, in one example, pattern distance calculator 510 may determine that the distance between access patterns J and J+1 is equal to the distance between access patterns J+1 and J+2 for array variables 460-480 (e.g., U, V, and W).

As further shown in FIGS. 5A and 5B, pattern distance calculator 510 may provide the calculated distances 545 to distance comparer 515. Distance comparer 515 may receive distances 545 from pattern distance calculator 510, and may determine whether distances 545 are equivalent. For example, distance comparer 515 may impose a dynamic test on code portion 400 (e.g., in a loop prolog of code portion 400) that may determine whether distances 545 are all the same. Distance comparer 515 may provide distances 545, determined to be equivalent, to address calculation sharer 520, as indicated by reference number 550.

Address calculation sharer 520 may receive equivalent distances 550 from distance comparer 515, and may share address calculations 555 for array accesses 530 associated with equivalent distances 550. Address calculation sharer 520 may provide shared address calculations 555 to multi-version loop constructor 525. For example, code portion 400 may include address calculations that adhere to the following form: (Base+(Index×Scale)+Offset). If a distance is assumed to be 32 bytes, address calculation sharer 520 may use 4 and 8 as common scaling factors with a common index value of 8. The common index value may be provided in a physical register (e.g., associated with processing unit 220) and may be shared in all calculations for array variables 460-480 (e.g., U, V, and W) when distances 545 are determined to be equivalent. If an array is larger (i.e., includes more array variables), the common index value may be larger. Referring back to FIG. 6, address calculation sharer 520 may determine an address of first point 640, at V(4, 1, 1), to be (V+0); may determine an address of second point 650, at V(4, 2, 1), to be (V+(8×4)+0); and may determine an address of third point 660, at V(4, 3, 1), to be (V+(8×8)+0). Address calculation sharer 520 may repeat the address calculations for array variables 470 and 480 (e.g., for V and W).

In one example embodiment, address calculation sharer 520 may detect array shapes that are similar by examining expressions that build shared address calculations 555. If all distances associated with code portion 400 are determined to be equivalent, address calculation sharer 520 may share some components of address calculations 555. For example, address calculation sharer 520 may share distances between U's J and J+1 access patterns, distances between U's J+1 and J+2 access patterns, and distances for V's and W's access patterns, as part of an address expression for each set of accesses. Such address calculations may be expressed in most modern architectures, such as complex instruction set computing (CISC)-based and reduced instruction set computing (RISC)-based architectures.

Multi-version loop constructor 525 may receive shared address calculations 555 from address calculation sharer 520, and may construct a set of multi-version loops based on shared address calculations 555. For example, multi-version loop constructor 525 may construct a first multi-version loop of code portion 400 that includes the calculated distances 545 applied to resources, as indicated by reference number 560. Multi-version loop constructor 525 may construct a second multi-version loop in the original format of code portion 400 (i.e., that does not include the calculated distances 545) in order to preserve correctness for a false case. As further shown in FIG. 5B, code portion 400 and multi-version loop 560 may correspond to compiled executable code 330 (FIG. 3).

The unification test performed by compiler 310, as described above in connection with FIGS. 5A-6, may not require complete knowledge of an array shape, but may still deliver significant performance improvements when register pressure is great, such as in CISC-based architectures. In one example, the unification test may effectively remove from about 12% to about 50% of the spill code in code portion 400.

Although FIGS. 5A and 5B show example functional components of compiler 310, in other embodiments, compiler 310 may include fewer functional components, different functional components, differently arranged functional components, or additional functional components than depicted in FIGS. 5A and 5B. Alternatively, or additionally, one or more functional components of compiler 310 may perform one or more other tasks described as being performed by one or more other functional components of compiler 310.

Example Alignment Source Code

FIG. 7 is a diagram of an example portion 700 of alignment source program code that may be generated by code generator 300 and compiled by compiler 310. In one example embodiment, code portion 700 may include Fortran code. In other embodiments, code portion 700 may include code in other programming languages, such as Pascal, C, C++, etc.

As further shown in FIG. 7, code portion 700 may include a loop 710 associated with parameters I, I1, and I2. A plurality of arrays may be calculated within loop 710 of code portion 700. For example, a first array 720, DUDZ(I), may be accessed via loop 710; a second array 730, DVDZ(I), may be accessed via loop 710; and a third array 740, DWDZ(I), may be accessed via loop 710. First array 720 may include an array variable 750 (UAV), second array 730 may include an array variable 760 (VAV), and third array 740 may include an array variable 770 (WAV).

In one example embodiment, code portion 700 may correspond to generated code 320 received by compiler 310 (FIG. 3). Compiler 310 may receive code portion 700, may identify array access patterns (e.g., K+2, K+1, K−2, and K−1) in code portion 700, and may group the array access patterns for a set of variables (e.g., for array variables UAV, VAV, and WAV). Compiler 310 may test an alignment of each group of array access patterns (e.g., K+2, K+1, K−2, and K−1). If the alignment of a particular group is unshared, compiler 310 may output an unaligned loop for the particular group. If the alignment of the particular group is shared, compiler 310 may determine whether a portion of the particular group is fully aligned. If the portion of the particular group is fully aligned, compiler 310 may output the fully aligned portion. If the portion of the particular group is not fully aligned, compiler 310 may peel code from the portion, may output the fully aligned portion after the peeling of the code, and may fix the fully aligned portion (if necessary). Compiler 310 may execute code portion 700 with the fully aligned portion, the fixed fully aligned portion, and/or the unaligned portion. Further details of how compiler 310 may analyze code portion 700 are provided below in connection with, for example, FIG. 8.

Although FIG. 7 shows example elements of code portion 700, in other embodiments, code portion 700 may include fewer elements, different elements, differently arranged elements, or additional elements than depicted in FIG. 7.

Further Example Operation of Compiler

Figure 8:
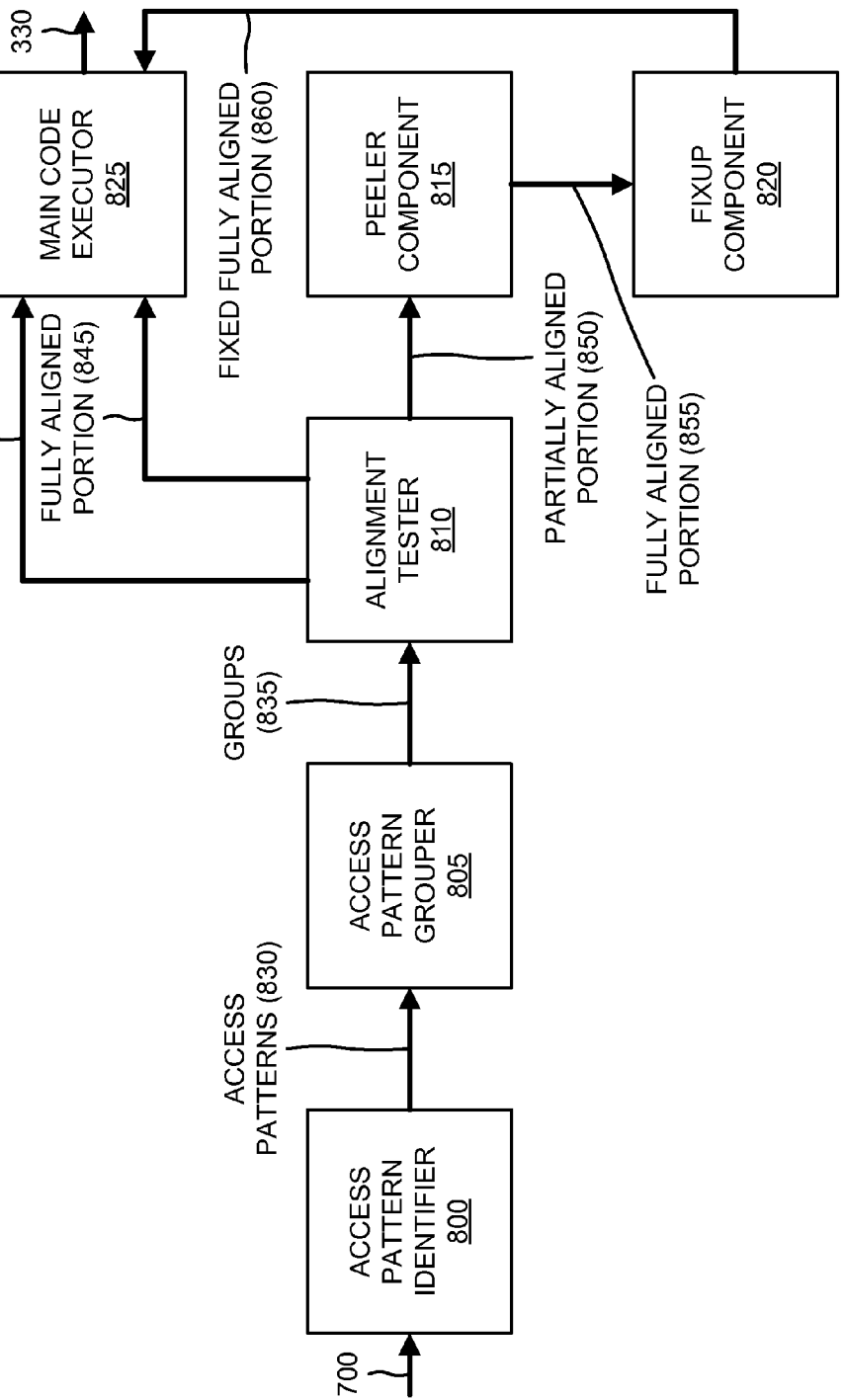
FIG. 8 is a diagram of further example functional components of the compiler depicted in FIG. 3.

FIG. 8 is a diagram of further example functional components of compiler 310. As shown, compiler 310 may include an access pattern identifier 800, an access pattern grouper 805, an alignment tester 810, a peeler component 815, a fixup component 820, and a main code executor 825.

Access pattern identifier 800 may receive code portion 700 from code generator 300, and may identify array access patterns 830 in code portion 700. For example, with reference to FIG. 7, access pattern identifier 800 may identify array access patterns, K+2, K+1, K−2, and K−1, for array variables (e.g., UAV, VAV, and WAV) in code portion 700. Access pattern identifier 800 may provide array access patterns 830 to access pattern grouper 805.

Access pattern grouper 805 may receive array access patterns 830 from access pattern identifier 800, and may group array access patterns 830, for a set of variables, to produce groups 835 of array access patterns 830. For example, access pattern grouper 805 may group access patterns, K+2, K+1, K−2, and K−1, for array variables (e.g., UAV, VAV, and WAV) in code portion 700. In one embodiment, access pattern grouper 805 may group array access patterns 830 for array variables (e.g., UAV, VAV, and WAV) using an index set, such as (I, J, K+2), (I, J, K+1), (I, J, K−1), and/or (I, J, K−2). Access pattern grouper 805 may provide groups 835 of array access patterns 830 to alignment tester 810. In one embodiment, access pattern grouper 805 may group array access patterns 830 into other types of associated groups.

Alignment tester 810 may receive groups 835 from access pattern grouper 805, and may test an alignment of each group 835 using an "exclusive or" operation on address values as a unity alignment test. Alignment tester 810 may retain the results of the alignment tests. Alignment tester 810 may detect if array access patterns 830 of each group 835 are fully aligned or have the same (or shared) alignment and are misaligned (or off) by a single iteration. If array access patterns 830 of a particular group 835 do not share an alignment (i.e., are unaligned), alignment tester 810 may output an unaligned portion 840 associated with the particular group 835. Alignment tester 810 may provide unaligned portion 840 to main code executor 825, as further shown in FIG. 8.

If array access patterns 830 of a particular group 835 share an alignment (i.e., are aligned), alignment tester 810 determine whether array access patterns 830 of the particular group 835 are fully aligned or are off by a single iteration. In one example, it may be assumed that array access patterns 830 of the particular group 835 include data targets that are packed double vectors with a granular alignment that is either fully aligned or off by a single iteration from full alignment. In such an example, array access patterns 830 of the particular group 835 may be aligned when a final byte of addresses is modulo the same (e.g., ending in 0 or 8). The modulo number may depend on a size of a data read and may be a factor of eight. When the final byte of the addresses in array access patterns 830 of the particular group 835 ends in "0," alignment tester 810 may determine array access patterns 830 of the particular group 835 to be fully aligned and may output a fully aligned portion 845 associated with the particular group 835. Alignment tester 810 may provide fully aligned portion 845 to main code executor 825, as further shown in FIG. 8. When the final byte of the addresses in array access patterns 830 of the particular group 835 ends in "8," alignment tester 810 may determine array access patterns 830 of the particular group 835 to be partially aligned and may output a partially aligned portion 850 associated with the particular group 835. Alignment tester 810 may provide partially aligned portion 850 to peeler component 815, as further shown in FIG. 8.

Peeler component 815 may receive partially aligned portion 850 from alignment tester 810, and may peel (or remove) a single iteration from partially aligned portion 850 to produce a fully aligned portion 855. Peeler component 815 may provide fully aligned portion 855 to fixup component 820, as further shown in FIG. 8. For example, for partially aligned portion 850, peeler component 815 may peel a single iteration out of the loop body to make the final byte of the addresses to be equal to "0" in the loop kernel.

Fixup component 820 may receive fully aligned portion 855 from peeler component 815, and may perform a fixup iteration in a loop epilog of fully aligned portion 855. In one example, the fixup iteration may ensure that work performed in fully aligned portion 855 is performed the same way as before partially aligned portion 850 is peeled by peeler component 815. Fixup component 820 may provide a fixed fully aligned portion 860 to main code executor 825, as further shown in FIG. 8.

Main code executor 825 may receive unaligned portion 840 and fully aligned portion 845 from alignment tester 810, and may receive fixed fully aligned portion 860 from fixup component 820. Main code executor 825 may execute a main part of code portion 700 with unaligned portion 840, fully aligned portion 845, and/or fixed fully aligned portion 860. In one example, main code executor 825 may create a version of loop 710 that utilizes fully aligned portion 845. Alternatively, or additionally, main code executor 825 may create a version of loop 710 that utilizes fixed fully aligned portion 860. As further shown in FIG. 8, based on execution of main part of code portion 700, main code executor 825 may output compiled executable code 330 (FIG. 3).

Although FIG. 8 shows example functional components of compiler 310, in other embodiments, compiler 310 may include fewer functional components, different functional components, differently arranged functional components, or additional functional components than depicted in FIG. 8. Alternatively, or additionally, one or more functional components of compiler 310 may perform one or more other tasks described as being performed by one or more other functional components of compiler 310.

Example Processes

Figure 9:
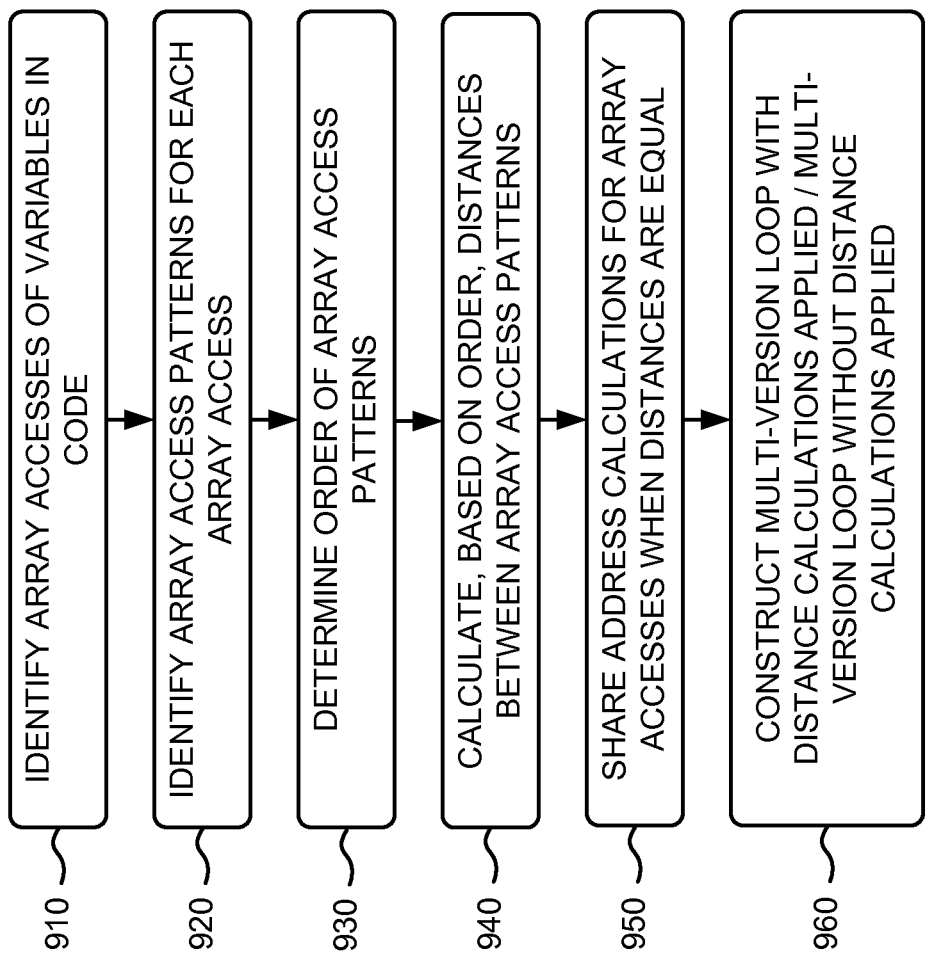
FIG. 9 is a flow chart of an example process for creating multiple versions for interior pointers of an array according to an embodiment described herein.

FIG. 9 is a flow chart of an example process 900 for creating multiple versions for interior pointers of an array according to an embodiment described herein. In one embodiment, process 900 may be performed by device 110 (FIG. 1). In another embodiment, some or all of process 900 may be performed by one or more components of device 110, such as by compiler 310 (FIG. 3).

As illustrated in FIG. 9, process 900 may include identifying array accesses of variables in code (block 910), and identifying access patterns for each array access (block 920). For example, in embodiments described above in connection with FIG. 5A, array access identifier 500 of compiler 310 may receive code portion 400 from code generator 300, and may identify array accesses 530 of variables in code portion 400. In one example, array access identifier 500 may identify accesses of arrays 430-450 based on array variables 460-480 (e.g., based on U, V, and W). Access pattern identifier 505 of compiler 310 may receive array accesses 530 from array access identifier 500, and may identify array access patterns 535 for each array access 530. In one example, access pattern identifier 505 may identify internal access patterns, such as J, J+1, and J+2, for array variable 460 (U), and may identify internal access patterns for array variable 470 (V) and array variable 480 (W).

As further shown in FIG. 9, process 900 may include determining an order of the array access patterns (block 930), and calculating, based on the order, distances between the array access patterns (block 940). For example, in embodiments described above in connection with FIG. 5A, access pattern identifier 505 may determine (e.g., using a shape analysis) order 540 for array access patterns 535. In one example, access pattern identifier 505 may use a shape analysis to detect the ordering of access patterns, J, J+1, and J+2, for the analyzed arrays 430-450. Pattern distance calculator 510 of compiler 310 may receive array access patterns 535 and/or order 540 from access pattern identifier 505, and may calculate, based on order 540, distances 545 between array access patterns 535. In one example, pattern distance calculator 510 may calculate a distance between access patterns J and J+1 and a distance between access patterns J+1 and J+2 for array variables 460-480 (e.g., U, V, and W).

Returning to FIG. 9, process 900 may include sharing address calculations for array accesses when the distances between the array access patterns are equal (block 950), and constructing a multi-version loop with the distance calculations applied and another multi-version loop without the distance calculations applied (block 960). For example, in embodiments described above in connection with FIG. 5B, distance comparer 515 of compiler 310 may receive distances 545 from pattern distance calculator 510, and may determine whether distances 545 are equivalent. In one example, distance comparer 515 may impose a dynamic test on code portion 400 (e.g., in a loop prolog of code portion 400) that may determine whether distances 545 are all the same. Address calculation sharer 520 of compiler may receive equivalent distances 550 from distance comparer 515, and may share address calculations 555 for array accesses 530 associated with equivalent distances 550. In one example, address calculation sharer 520 may detect array shapes that are similar by examining expressions that build shared address calculations 555. If all distances associated with code portion 400 are determined to be equivalent, address calculation sharer 520 may share some components of address calculations 555. Multi-version loop constructor 525 of compiler 310 may receive shared address calculations 555 from address calculation sharer 520, and may construct a first multi-version loop that includes the calculated distances 545 applied to resources, as indicated by reference number 560. Multi-version loop constructor 525 may construct a second multi-version loop in the original format of code portion 400 (i.e., that does not include the calculated distances 545) in order to preserve correctness for a false case.

FIG. 10 is a flow chart of an example process 1000 for creating multiple versions for alignment of an array according to an embodiment described herein. In one embodiment, process 1000 may be performed by device 110 (FIG. 1). In another embodiment, some or all of process 1000 may be performed by one or more components of device 110, such as by compiler 310 (FIG. 3).

As illustrated in FIG. 10, process 1000 may include identifying array access patterns in code (block 1010), and grouping the array access patterns for a set of variables (block 1020). For example, in embodiments described above in connection with FIG. 8, access pattern identifier 800 of compiler 310 may receive code portion 700 from code generator 300, and may identify array access patterns 830 in code portion 700. In one example, access pattern identifier 800 may identify array access patterns, K+2, K+1, K−2, and K−1, for array variables (e.g., UAV, VAV, and WAV) in code portion 700. Access pattern grouper 805 of compiler 310 may receive array access patterns 830 from access pattern identifier 800, and may group array access patterns 830, for a set of variables, to produce groups 835 of array access patterns 830. In one example, access pattern grouper 805 may group access patterns, K+2, K+1, K−2, and K−1, for array variables (e.g., UAV, VAV, and WAV) in code portion 700.

As further shown in FIG. 10, process 1000 may include testing an alignment of each group of array access patterns (block 1015). If a portion of a particular group does not share an alignment (block 1015—UNSHARED ALIGNMENT), process 1000 may include outputting an unaligned portion of the particular group (block 1020). For example, in embodiments described above in connection with FIG. 8, alignment tester 810 of compiler 310 may receive groups 835 from access pattern grouper 805, and may test an alignment of each group 835 using an "exclusive or" operation on address values as a unity alignment test. Alignment tester 810 may detect if array access patterns 830 of each group 835 are fully aligned or have the same (or shared) alignment and are misaligned (or off) by a single iteration. If array access patterns 830 of a particular group 835 do not share an alignment (i.e., are unaligned), alignment tester 810 may output unaligned portion 840 associated with the particular group 835.

Returning to FIG. 10, if a portion of a particular group shares an alignment (block 1015—SHARED ALIGNMENT), process 1000 may include determining whether the portion of the particular group is fully aligned (block 1025). If the portion of the particular group is fully aligned (block 1025—YES), process 1000 may include outputting the fully aligned portion of the particular group (block 1030). For example, in embodiments described above in connection with FIG. 8, if array access patterns 830 of a particular group 835 share an alignment (i.e., are aligned), alignment tester 810 determine whether array access patterns 830 of the particular group 835 are fully aligned or are off by a single iteration. When the final byte of the addresses in array access patterns 830 of the particular group 835 ends in "0," alignment tester 810 may determine array access patterns 830 of the particular group 835 to be fully aligned and may output fully aligned portion 845 associated with the particular group 835.

As further shown in FIG. 10, if the portion of the particular group is not fully aligned (block 1025—NO), process 1000 may include peeling code from the portion of particular group to obtain a fully aligned portion of the particular group (block 1035), outputting the fully aligned portion of the particular group (block 1040), and outputting a fixup version of the fully aligned portion of the particular group (block 1045). For example, in embodiments described above in connection with FIG. 8, peeler component 815 of compiler may receive partially aligned portion 850 from alignment tester 810, and may peel a single iteration from partially aligned portion 850 to produce a fully aligned portion 855. In one example, for partially aligned portion 850, peeler component 815 may peel a single iteration out of the loop body to make the final byte of the addresses to be equal to "0" in the loop kernel. Fixup component 820 of compiler 310 may receive fully aligned portion 855 from peeler component 815, and may perform a fixup iteration in a loop epilog of fully aligned portion 855. In one example, the fixup iteration may ensure that work performed in fully aligned portion 855 is performed the same way as before partially aligned portion 850 is peeled by peeler component 815.

Returning to FIG. 10, process 1000 may include executing a main portion of the code with the fully aligned portion, the fixup fully aligned portion, and/or the unaligned portion (block 1050). For example, in embodiments described above in connection with FIG. 8, main code executor 825 of compiler 310 may receive unaligned portion 840 and fully aligned portion 845 from alignment tester 810, and may receive fixed fully aligned portion 860 from fixup component 820. Main code executor 825 may execute a main part of code portion 700 with unaligned portion 840, fully aligned portion 845, and/or fixed fully aligned portion 860. In one example, main code executor 825 may create a version of loop 710 that utilizes fully aligned portion 845. Alternatively, or additionally, main code executor 825 may create a version of loop 710 that utilizes fixed fully aligned portion 860.

Conclusion

In one embodiment, systems and/or methods described herein may provide a unification test that determines, without complete information about an array shape, whether array accesses to multiple array variables have similar access patterns. In another embodiment, systems and/or methods described herein may provide a unification test technique that efficiently identifies alignment groupings for multidimensional array variables that have similar access patterns.

The foregoing description of embodiments provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 9 and 10, the order of the blocks may be modified in other embodiments. Further, non-dependent blocks may be performed in parallel.

It will be apparent that aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein. The software may also include hardware description language (HDL), Verilog, Register Transfer Level (RTL), Graphic Database System (GDS) II data or the other software used to describe circuits and arrangement thereof. Such software may be stored in a computer readable media and used to configure a manufacturing process to create physical circuits capable of operating in manners which embody aspects of the present invention.

Further, certain embodiments described herein may be implemented as "logic" that performs one or more functions. This logic may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   identifying, by a device, array accesses of a plurality of variables in a program code,
   the program code including a plurality of arrays,
   each variable, of the plurality of variables, being included in a different array of the plurality of arrays;
   identifying, by the device and based on the array accesses, array access patterns for each variable of the plurality of variables;
   determining, by the device, an order of the array access patterns identified for each variable of the plurality of variables;
   calculating, by the device and based on the order, a plurality of distances between the array access patterns identified for each variable of the plurality of variables;
   identifying, by the device and for each variable of the plurality of variables, one or more distances, of the plurality of distances, that are equivalent; and
   sharing, by the device and for each array of the plurality of arrays, address calculations for one or more of the array accesses associated with the one or more distances that are equivalent.

2. The method of claim 1, further comprising:
   creating a compiled version of the program code that includes the shared address calculations.

3. The method of claim 2, where the compiled version of the program code includes:
   a first multi-version loop with the plurality of distances between the array access patterns identified for each variable of the plurality of variables; and
   a second multi-version loop without the plurality of distances between the array access patterns identified for each variable of the plurality of variables.

4. The method of claim 1, where the device comprises a compiler provided in a computing device.

5. The method of claim 1, where the shared address calculations, for each array of the plurality of arrays, include common scaling factors and a common index value.

6. The method of claim 5, where a size of the common index value is based on sizes of the plurality of arrays.

7. A compiler of a device, the compiler comprising:
   processing logic, implemented at least partially in hardware, to:
   identify array accesses of a plurality of variables in a program code, the program code including a plurality of arrays,
each variable, of the plurality of variables, being included in a different array of the plurality of arrays,
identify, based on the array accesses, array access patterns for each variable of the plurality of variables;
determine an order of the array access patterns identified for each variable of the plurality of variables;
calculate, based on the order, a plurality of distances between the array access patterns identified for each variable of the plurality of variables;
share, for each array of the plurality of arrays, address calculations for one or more of the array accesses associated with one or more distances, of the plurality distances, that are equivalent, and
create a compiled version of the program code that includes the shared address calculations.

8. The compiler of claim 7, where the compiled version of the program code includes:
a first multi-version loop with the plurality of distances between the array access patterns identified for each variable of the plurality of variables; and
a second multi-version loop without the plurality of distances between the array access patterns identified for each variable of the plurality of variables.

9. The compiler of claim 7, where the shared address calculations include common scaling factors and a common index value.

10. The compiler of claim 9, where a size of the common index value is based on sizes of the plurality of arrays provided in the program code.

11. A method, comprising:
identifying, by a device, array access patterns in a program code that includes multiple arrays;
grouping, by the device, the array access patterns for a set of variables of the multiple arrays to obtain a plurality of groups of array access patterns;
testing, by the device, an alignment for each group of array access patterns of the plurality of groups of array access patterns;
determining, by the device and based on testing the alignment for each group of array access patterns of the plurality of groups of array access patterns, that a particular group of array access patterns, of the plurality of groups of array access patterns, includes a shared alignment;
determining, by the device, whether the particular group of array access patterns includes a fully aligned portion of the program code after determining that the particular group of array access patterns includes the shared alignment;
removing, by the device, a single iteration from a partially aligned portion of the program code to produce another fully aligned portion of the program code when the particular group of array access patterns includes the partially aligned portion of the program code; and
selectively executing, by the device, the program code with the fully aligned portion of the program code or executing the program code with the other fully aligned portion of the program code.

12. The method of claim 11, further comprising:
determining that another particular group of array access patterns includes an unshared alignment; and
executing the program code with an unaligned portion of the program code associated with the other particular group of array access patterns.

13. The method of claim 11, further comprising:
determining that the particular group of array access patterns includes the partially aligned portion of the program code; and
removing the single iteration of the partially aligned portion of the program code to produce the other fully aligned portion of the program code based on determining that the particular group of array access patterns includes the partially aligned portion of the program code,
where selectively executing the program code with the fully aligned portion or executing the program code with the other fully aligned portion includes executing the program code with the other fully aligned portion.

14. The method of claim 13, further comprising:
fixing the other fully aligned portion of the program code to obtain a fixed other aligned portion; and
executing the program code with the fixed other fully aligned portion.

15. The method of claim 11, further comprising:
determining that the particular group the array access patterns includes the shared alignment when a final byte of addresses, associated with the particular group of array access patterns, is a same particular number.

16. A compiler of a device, the compiler comprising:
processing logic, implemented at least partially in hardware, to:
identify array access patterns in a program code that includes multiple arrays,
group the array access patterns for a set of variables of the multiple arrays,
test an alignment for each group of the array access patterns,
determine, based on testing the alignment for each group of the array access patterns, whether a particular group of the array access patterns includes a shared alignment or an unshared alignment,
determine whether the particular group of the array access patterns includes a fully aligned portion of the program code when the particular group of the array access patterns includes the shared alignment, and
selectively:
execute the program code, with an unaligned portion of the program code associated with the particular group of the array access patterns, to create a first compiled version of the program code, when the particular group of the array access patterns includes the unshared alignment, or
execute the program code, with the fully aligned portion of the program code, to create a second compiled version of the program code, when the particular group of the array access patterns includes the fully aligned portion of the program code.

17. The compiler of claim 16, where the processing logic is further to:
determine that the particular group of the array access patterns includes the unshared alignment, and
where, when selectively executing the program code with the unaligned portion or executing the program code with the fully aligned portion of the program code, the processing logic is to:
execute the program code with the unaligned portion of the program code associated with the particular group of the array access patterns based on determining that the particular group of the array access patterns includes the unshared alignment.

18. The compiler of claim 16, where the processing logic is further to:
- determine that the particular group of the array access patterns includes a partially aligned portion of the program code,
- remove a single iteration of the partially aligned portion of the program code to produce another fully aligned portion of the program code, and
- execute the program code with the other fully aligned portion of the program code based on determining that the particular group of the array access patterns includes the partially aligned portion of the program code.

19. The compiler of claim 18, where the processing logic is further to:
- fix the other fully aligned portion of the program code to obtain a fixed other fully aligned portion of the program code, and
- where, when executing the program code with the other fully aligned portion of the program code, the processing logic is to:
  - execute the program code with the fixed other fully aligned portion of the program code.

20. The compiler of claim 16, where the processing logic is further to:
- determine that the particular group of the array access patterns includes the shared alignment when a final byte of addresses, associated with the particular group of the array access patterns, is a same number.

* * * * *